INVENTORS
HEINRICH LIND
HANS MAHL
EKKEHARD BEER

United States Patent Office 3,695,972
Patented Oct. 3, 1972

3,695,972
PROCESS FOR THE CONTINUOUS PRODUCTION OF A FLEXIBLE POROUS MULTILAYER WEB HAVING A HIGH-GLOSS OUTER SURFACE
Heinrich Lind, Diedenbergen, Hans Mahl, Wiesbaden, and Ekkehard Beer, Bad Schwalbach, Germany, assignors to Kalle Aktiengesellschaft, Wiesbaden-Biebrich, Germany
Filed Aug. 12, 1970, Ser. No. 63,054
Claims priority, application Germany, Aug. 14, 1969, P 19 41 412.1
Int. Cl. B44d 1/14; D06n 3/08
U.S. Cl. 156—324                              18 Claims

ABSTRACT OF THE DISCLOSURE

This invention relates to a process for the continuous production of a flexible, porous multilayer web having a high-gloss outer surface; and to the material so produced, which process comprises continuously applying a liquid layer of a urethane prepolymer solution at a uniform thickness to the surface of a microporous layer of a polymer based on polyurethane on a fiber fleece web moving at a constant speed, and heating the layer to polymerize the prepolymer. The layer may then be cooled, covered with a smooth high-gloss film, and wound onto a supply roll.

---

Figure 1:
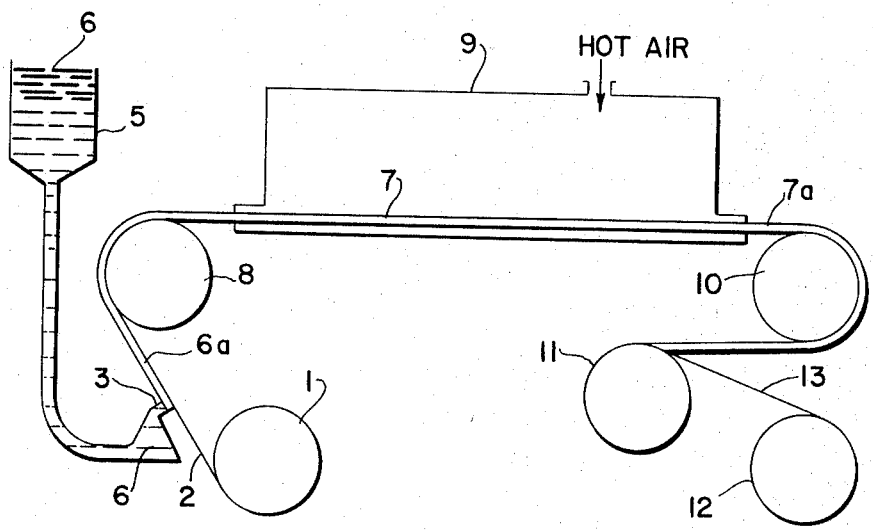

This invention relates to a process for the continuous production of a flexible layer of high-polymer material, having a smooth high-gloss outer surface, on the surface of a flexible porous multilayer web.

The present invention particularly relates to a process for the continuous production of a flexible layer comprising the high-molecular weight reaction product of a polyfunctional isocyanate with compounds containing OH terminal groups, having a smooth, high-gloss outer surface, on the surface of a microporous layer, based on polyurethane, on a porous fiber fleece web.

The present invention further relates to a web material produced according to the process and having one lacquered surface.

Such coated webs may be used instead of patent leather as a material for shoe uppers and garments or for fancy leather articles.

The known processes for lacquering leather or leather-like substitutes require much time due to the long drying times or result in products of poor storage properties, poor surface luster of the lacquer layer and brittleness, as well as poor color fastness of the lacquer layer.

The word "fastness" means that certain properties of a product which can be characterized by physical and/or technical application data remain unchanged or substantially unchanged over a sufficiently long period under the conditions of use.

Known processes for producing high-gloss lacquer layers on leather with the use of polyurethane reaction lacquers are the cold varnish processes. They require a hardening period of about twelve hours for hardening the lacquer layer and, for this reason, they are not suitable for mechanical and continuous lacquering of web material.

The present invention provides a process for the continuous production of a flexible layer of high-molecular weight reaction products of polyfunctional isocyanates with compounds containing OH terminal groups, which has a smooth, high-gloss outer surface, on the surface of a microporous layer, based on polyurethane, on a porous fiber fleece web. This process does not have the disadvantages of the known processes and it is possible to continuously produce multilayer material of the type described in which the lacquer layer exhibits a high gloss, a high resistance, is not brittle, and has good fastness properties.

In the process, a liquid layer of a prepolymer solution is continuously applied at a uniform layer thickness to the outer surface of a microporous layer of polymers based on polyurethane on a fiber fleece web advanced at a constant speed in the longitudinal direction of the web and heat is then caused to act upon the layer. If required, after drying the layer, the web support, lacquered on one side, is wound up.

The expression "web support" or "support" is used hereinafter for a fiber fleece having a microporous layer of polymer material on one surface thereof. The microporous layer of high-polymer material on the surface of the fleece is also called "top layer." The web support provided with the smooth, high-gloss lacquer layer on the outer surface is called the "web support lacquered on one side."

The process of the invention is performed in a manner such that a web based on fibrous material and having a microporous outer layer of polymer material is continuously drawn from a supply roll, a liquid layer of a prepolymer solution based on a reaction product of polyfunctional isocyanates and compounds with OH terminal groups is applied to the outer surface of the microporous layer, advantageously having a known finish layer, and the liquid layer is then heated for a sufficiently long time at a sufficient intensity. "For a sufficiently long time" means a period which suffices for converting the layer of liquid prepolymer solution into a lacquer layer insoluble in conventional organic solvents. This period which is also called the "hardening time" ranges from 5 to 60 minutes, particularly from 5 to 40 minutes. "Sufficient intensity" is the action of heat which suffices to heat the layer of prepolymer solution to a temperature in the range from 80° C. to 150° C., particularly to a temperature from 100° C. to 130° C. By the action of heat, the prepolymer contained in the layer are polymerized and thus become insoluble or substantially insoluble in conventional organic solvents. Instead of the expression "polymerized," the term "hardened" is also used. Hardening of the layer is performed, for example, by conveying the lacquered web support through an oven into which hot air at a temperature in the range from 80° C. to 150° C. is introduced.

After complete hardening of the lacquer layer, the lacquered web support may be dried.

The lacquer layer produced on the support material is distinguished by its high resistance to creasing and bending, i.e. the layer may be subjected to 20,000 strokes in a Bally flexometer without the surface of the layer being affected.

It is particularly advantageous to cool the lacquered web support after hardening and before winding it onto a supply roll. This may be performed, for example, by contacting the lacquered web support with the cooled surface of a roll in such a manner that the non-lacquered surface of the lacquered web support contacts the surface of the cooling roll.

Winding up of the lacquered web support is performed advantageously when, prior to winding up, the lacquered layer of the web support is continuously covered by a web of material having a smooth surface and being sufficiently rigid and sufficiently elastic. Particularly suitable therefor are plastic films with smooth surfaces, especially a plastic film of which one surface is metallized. The purpose of this is to prevent the high-gloss lacquer surface on the web support from being damaged by the back of an adjacent ply within the roll.

A suitable web support is a mechanically and/or chemically bonded fiber fleece having a microporous polyurethane top layer. Particularly suitable are fiber fleeces of synthetic fibers, preferably of polyethhylene terephthalate fibers. The fiber fleece also may be a mixture of synthetic and natural fibers.

The web support has a surface weight in the range from 200 to 1,000 g./m.², particularly in the range from 400 to 700 g./m.². The microporous top layer of the web support comprises polymer material, particularly from synthetic polymers, more particularly from polyurethane.

If required, the outer surface of the top layer also may have a finish medium of a mixture of polymers and pigments.

Also, in those cases in which the microporous layer of the support has a finish on its outer surface the expressioin used is "the outer surface of the microporous layer from polymers."

The lacquer used for the preparation of the lacquer layer is a mixture dissolved in an organic solvent, or in a mixture of several organic solvents, and comprising components containing reactive NCO groups and chemical compounds having two and/or three OH terminal groups. Suitable solvents are ethyl acetate, butyl acetate, ethyl glycol acetate, methyl glycol acetate, methoxy butyl acetate, and cyclohexanone. Preferably, mixtures of these solvents are used, particularly a mixture of ethyl acetate, cyclohexanone and another one of the solvents.

Suitable components containing NCO groups are aliphatic, aromatic, cyclic or heterocyclic diisocyanates, naphthalene-1,5-diisocyanate, tetramethylene - 1,4 - diisocyanate, hexamethylene-1,6-diisocyanate, decamethylene-1,10 - diisocyanate, cyclohexane-1,4-diisocyanate, diphenylmethane-diisocyanate, toluylene - diisocyanate, and dimethyl - diphenylmethane - diisocyanate, as well as low-molecular weight isocyanates resulting from the reaction with water or amines; particularly suitable, however, are addition products of the isocyanates with diols or triols.

It is also possible to employ mixtures of the components containing NCO groups.

Suitable chemical compounds with OH terminal groups are polyesters, polyethers, polyether esters, branched or unbranched, of molecular weights in the range of 1,000 to 3,000. Mixtures of these compounds also may be used.

The lacquers used preferably have solids contents in the range from 20 to 80 percent by weight, particularly from 50 to 75 percent by weight. The lacquer empolyed according to the process has a viscosity in the range of 50 to 1,600 cp., particularly 90 to 500 cp.

The thickness of the lacquer layer applied ranges from 50 to 1,000μ, particularly from 100 to 500μ.

The completely hardened and dried lacquer layer of the lacquered support has a thickness in the range from 20 to 500μ, particularly from 50 to 300μ.

Prior to applying the lacquer in accordance with the process, the reactive components present in the lacquer solution are allowed to react until a prepolymer solution is obtained. The reaction time for achieving the desired chemical and physical state of the lacquer prior to applying the same to the support ranges from 10 minutes to 5 hours. The duration of reaction depends upon the temperature at which the reaction leading to the prepolymers is performed. This reaction preferably is performed at 15° C. to 30° C.; the reaction time then ranges from 15 minutes to 2 hours. At 20° C., the prepolymer solution to be applied to the support has a viscosity in the range of 50 to 1,600 cp., particularly 90 to 500 cp.

Prepolymers are high-molecular weight substances which are obtained by chemical reaction in the liquid phase between compounds containing at leasat two NCO groups and those containing at least two OH groups and which are soluble in the aforementioned solvents. The prepolymers are bi- and/or trifunctional. Their reactive groups enable them, during the hardening process of the second process step, to polymerize to yield the high-polymer insoluble or substantially insoluble in the afore-mentioned solvents. They form the lacquer layer on the support material.

It is advantageous to accelerate the formation of the prepolymers and the hardening procedure by the addition of catalysts to the prepolymer solution in a quantity in the range from 0.1 to 1 percent by weight, calculated on the solids content of the prepolymer solution.

Preferable reaction accelerators are organotin compounds, e.g. dibutyl tin diacetate, dibutyl tin oxalate, and dibutyl tin maleate, particularly, however, dibutyl tin dilaurate, dibutyl tin dichloride, and dibutyl tin glycolate. Tertiary amines, e.g., triethylene amine, hexamethylene tetramine, N-methyl morpholine, and diazobicyclooctane, are also suitable.

When using prepolymer solutions without adding catalysts, the hardening time ranges from 20 to 60 minutes, particularly from 20 to 40 minutes.

When using prepolymer solutions containing catalysts, the hardening time ranges from 5 to 10 minutes.

The lacquer applied in accordance with the process may contain dyestuffs and/or pigments, particularly advantageously color-yielding pigments.

Particularly suitable are organic dyestuffs, inorganic and organic, metallic and non-metallic, color-yielding pigments or pigments with iridescent gloss or nacreous effect and of a particle size below 10μ.

Figure 2:
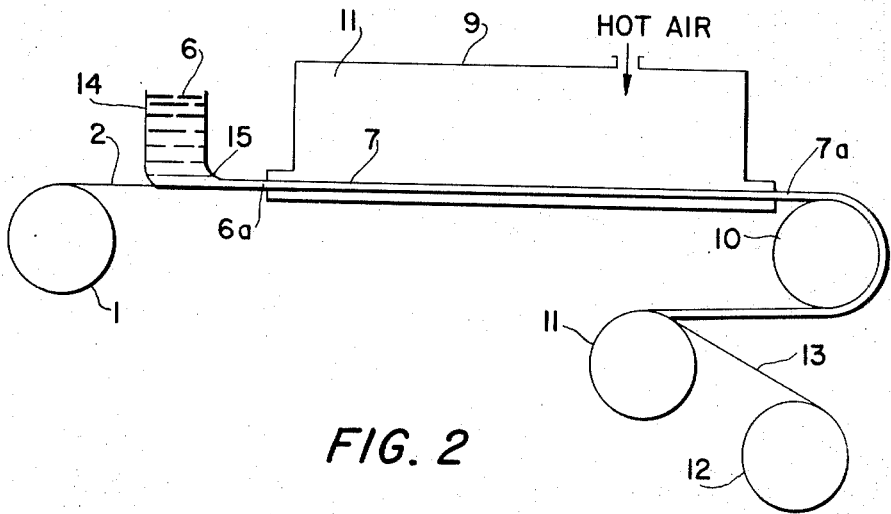

The process is further illustrated in the accompanying drawing in which FIGS. 1 and 2 diagrammatically show the process.

Referring to FIG. 1, numeral 1 is a supply roll from which the web support 2 is continuously drawn off. From the slot-shaped aperture 3 of the container 4 connected via a pipe with the supply container 5, a prepolymer solution contained in the supply container and in the container 4 leaves in the form of a liquid film; the slot-shaped aperture 3 of the container 4 extends perpendicularly to the direction of the web support and its length substantially corresponds to the width of the web support. The distance of the slot from the support surface to be covered is about 0.2 mm.; the slot width is 0.2 mm.

The prepolymer solution forms a liquid prepolymer-containing layer 6a on the outer microporous layer of the support. The support coated on one side with prepolymer solution, as indicated at 7, is turned at a guide roll 8 and introduced into the slot-shaped aperture of a hot-air oven 9 and passes therethrough horizontally. The action of heat on the prepolymer layer 6a of the coated support 7 effects reaction of the still reactive prepolymers present in the layer with the formation of high-polymer material. This procedure is termed hardening. After hardening, the support provided with the hardened lacquer layer, as indicated at 7a, leaves the discharge slot of the hot-air oven and, after complete removal of the remaining solvent in the lacquer layer, by means of air, is contacted with the cooled surface of a roll 10 in such a manner that the non-lacquered surface of the support contacts the cooled surface of the roll. After sufficient cooling of the lacquer layer, the lacquered web material is wound onto the roll 11. A plastic film with a smooth surface is conveyed to the roll 11 from another roll 12 in such a manner that the plastic film in the roll of the wound-up laquered web support is between the lacquered surface of a lower ply and the non-lacquered bottom of an adjacent support ply above.

Referring to FIG. 2, numerals 1, 2, 6, 6a, 7, 7a, 9, 10 to 13 have the same meanings as in FIG. 1. Numeral 14 designates a doctor box and numeral 15 a doctor slot. In the embodiment of the process shown in FIG. 2, the support leaves the supply roll horizontally, the microporous layer of the web support being on top and the die casting device being positioned above this layer.

The advantages of both embodiments of the process are as follows:

Embodiment according to FIG. 1: No web contact by the application device. The web-layer thickness depends considerably on the viscosity of the prepolymer solution applied.

Embodiment according to FIG. 2: The flexible support material is coated by the doctor box 14. The wet-layer thickness of the liquid prepolymer layer may be better adjusted, however.

The following examples further illustrate the invention.

EXAMPLE 1

100 parts by weight of a 76 percent by weight solution of a polyester containing 2.9 percent by weight of OH groups in a solvent mixtured based on an aliphatic acetic ester (e.g. Baygenlack, registered trademark of Farbenfabriken Bayer, Leverkusen, Germany) and 60 parts by weight of a 55 percent by weight solution of a polyfunctional isocyanate in a solvent mixture based on an aliphatic acetic ester (e.g. Baygenhärter S, registered trademark of Farbenfabriken Bayer, Leverkusen, Germany) are mixed and reacted for 2 hours with stirring at a temperature of 20° C. The resulting solvent mixture has a viscosity of 1,000 cp. at 25° C.

In a process as shown in FIG. 1, a fiber fleece web having a microporous top layer based on polyurethane is continuously drawn from a supply roll at a speed of 0.5 m./min. The fleece consists of 1.2 denier thick polyethylene terephthalate fibers randomly arranged and has a surface weight of 250 g./m.$^2$. The fleece is needled (400 stitches/cm.$^2$) and bonded by chemical means.

A liquid layer of the above-described liquid is then applied to the microporous top layer of the fleece web at a wet-layer thickness of 0.2 mm. The application of the prepolymer solution is performed, as shown in FIG. 1, by means of a die casting device having a casting slot width of 0.2 mm., the distance from the slot-shaped aperture to the surface of the fleece web being 0.2 mm. The length of the casting slot corresponds substantially to the width of the fleece web of 90 cm. The casting slot is positioned perpendicularly to the edges of the fleece web. After the application of the polymer solution, the web support provided with the liquid polymer layer is conveyed in the horizontal direction by means of a guide roll and runs into the inlet slot of a heating chamber to which hot air of 100° C. is admitted and, after hardening of the layer and sufficient removal of solvent, leaves the heating chamber at the discharge slot thereof. The heating chamber has a length of 15 m.; the coated web runs through the heating chamber at the before-mentioned speed. The non-lacquered surface of the fleece web is then contacted with the cooled surface of a roll and cooled thereby.

After cooling of the lacquer layer, the lacquered support material is wound up onto a roll and the high-gloss surface of the lacquered web support is simultaneously and continuously covered by a protecting film of polyester (e.g. Hostaphan film, registered trademark of Kalle AG, Wiesbaden-Biebrich, Germany) in order to avoid damage to the surface of the lacquer layer.

The resulting lacquered flexible, gas-permeable, multilayer material is distinguished by its high gloss, high abrasion resistance of the lacquer layer, and good creasing and bending properties of the same of 20,000 strokes in a Bally flexometer.

The material may be used for the production of shoe uppers, garments and fancy leather articles.

EXAMPLE 2

100 parts by weight of a solution composed of: 70 parts by weight of a 71 percent by weight solution of a polyester containing 1.4 percent by weight of OH groups in a solvent mixture based on an aliphatic acetic ester (e.g. Baygenlack K of Farbenfabriken Bayer, Leverkusen, Germany), 30 parts by weight of a 76 percent by weight solution of a polyester containing 2.9 percent by weight of OH groups in a solvent mixture based on an aliphatic acetic ester (e.g. Gaygenlack O of Farbenfabriken Bayer, Leverkusen, Germany), and 60 parts by weight of a 55 percent by weight solution of a polyfunctional isocyanate in a solvent mixture based on an aliphatic acetic ester (e.g. Baygenhärter S, registered trademark of Farbenfabriken Bayer, Leverkusen, Germany) are reacted for 60 minutes at 20° C.

In a modification of Example 1 under the process conditions of Example 1, the prepolymer solution prepared as indicated above is applied to the surface of the support material which is to be coated and provided with a conventional finish. The material produced is distnguished by high gloss, high abrasion resistance of the lacquer layer, and good creasing and bending properties of the same. It may be used for the production of shoe uppers, garments and fancy leather articles.

EXAMPLE 3

100 parts by weight of a commercial reaction lacquer provided with pigment and stabilizer and containing OH groups (e.g. BaygenLackweiss, N, registered trademark of Farbenfabriken Bayer, Leverkusen Germany), 35 parts by weight of a commercial hardener containing NCO groups and dissolved in a solvent mixture based on an aliphatic acetic ester (Baygenhärter S, registered trademark of Farbenfabriken Bayer, Leverkusen, Germany), and 20 parts by weight of a commercial solvent mixture (Baygen Verdünner, registered trademark of Farbenfabriken Bayer, Leverkusen, Germany) are mixed and reacted for 20 minutes. The liquid then has a viscosity of 500 cp. at 25° C.

This lacquer mixture is used for lacquering the multilayer material described in Example 1 by die casting in the manner described in Example 1. The white pigmented lacquer material obtained has a high gross, high abrasion resistance, and good creasing and bending properties and is suitable for the production of patent leather shoes, garments and bags.

EXAMPLE 4

Under the process conditions of Example 1, a prepolymer liquid is used, for coating the support material, which is prepared as follows: 105 parts by weight of a black pigmented lacquer, 5 parts by weight of (Egalonlackschwarz, registered trademark of Bayer, Leverkusen, Germany), 70 parts by weight of a 71 percent by weight solution of a polyester containing 1.4 percent by weight of OH groups in a solvent mixture based on an aliphatic acetic ester (e.g. Baygenlack K, registered trademark of Farbenfabriken Bayer, Leverkusen, Germany), 30 parts by weight of a 76 percent by weight solution of a polyester containing 2.9 percent by weight of OH groups in a solvent mixture based on a aliphatic acetic ester (e.g. Baygenlack O, registered trademark of Farbenfabriken Bayer, Leverkusen, Germany), and 60 parts by weight of a 55 percent by weight solution of a polyfunctional isocyanate in a solvent mixture based on an aliphatic acetic ester (e.g. Baygenhärter S, registered trademark of Farbenfabriken Bayer, Leverkusen, Germany) are reacted for 2 hours at a temperature of 20° C.

The liquid obtained has a viscosity of 500 cp. at 25° C. This lacquer mixture is used for lacquering the multilayer material described in Example 1 by die casting in the manner described in Example 1.

The black lacquer material obtained has a high gloss, high abrasion resistance, and good creasing and bending properties.

EXAMPLE 5

In a process as shown in FIG. 2, the microporous surface of the web support is continuously provided with a liquid layer, of a thickness of 0.4 mm., of a prepolymer solution having the composition described in Example 1. The liquid layer is discharged from the slot of a doctor box positioned above the horizontally running web support. The web support is advanced at a speed of 0.5 m./minute.

The doctor slot extends perpendicularly to the web direction and has substantially the same width as the web. The coated web support is then conveyed through an inlet slot into a 15 m. long drying chamber into which hot air at 100° C. is admitted and leaves it at a discharge slot. After leaving the drying chamber, the lacquer layer applied is sufficiently hardened and sufficiently free from solvent. After leaving the drying chamber, the non-lacquered surface of the web support is contacted with the cooled surface of a roll and, after sufficient cooling of the lacquer layer, wound up onto a roll. During winding up, it is simultaneously continuously covered by a metallized plastic film in a manner such that the metallized film surface is in contact with the high-gloss lacquer layer of the coated support material.

The lacquered multilayer material obtained has the same properties and can be used for the same purposes as the multilayer material produced according to Example 1.

EXAMPLE 6

A product with similar properties as those of the product according to Example 1 is obtained in the following manner:

To 70 parts by weight of a 71 percent by weight solution of a polyester containing 1.4 percent by weight of OH groups in a solvent mixture based on an aliphatic acetic ester (e.g. Baygenlack K, registered trademark of Farbenfabriken Bays, Leverkusen, Germany), there are sequentially added, with stirring at 20° C., 30 parts by weight of a 76 percent by weight solution of a polyester containing 2.9 percent by weight of OH groups in a solvent mixture based on an aliphatic acetic ester (e.g. Baygenlack O, registered trademark of Farbenfabriken Bayer, Leverkusen, Germany), 60 parts by weight of a 55 percent by weight solution of a polyfunctional isocyanate in a solvent mixture based on an aliphatic acetic ester (e.g. Baygenhärter S, registered trademark of Farbenfabriken Bayer, Leverkusen, Germany), 40 parts by weight of a solvent mixtue consisting of 3 percent by weight of cyclohexanone, 53 percent by weight of butyl acetate, and 38 percent by weight of ethyl acetate, and 1 part by weight of a 10 percent by weight solution of dibutyl tin dilaurate in ethyl acetate.

After a reaction time of 15 minutes at room temperature, the prepolymer solution of a viscosity of 100 cp. is applied to the web support at a wet-layer thickness of 0.2 mm., as indicated in Example 1. The web speed is 3 m./min., the gap width of the die casting device is 0.4 mm., the distance of the slot-shaped aperture from the web surface is 0.2 mm., and the length of the heating chamber is 15 m. Air at a temperature of 130° C., is admitted to the heating chamber.

The lacquered multilayer material may be used for the same purposes as the multilayer material produced according to Example 1.

EXAMPLE 7

A product with similar properties to those of the product according to Example 1 is obtained in the following manner:

Preparation of the prepolymer solution: To 100 parts by weight of a 70 percent by weight solution of a linear polyester of 4,4'-dioxydibutylether and adipic acid (molecular weight 1,681, OH number 65) in a solvent mixture based on an aliphatic acetic ester, there are added at 20° C., with stirring, 60 parts by weight of a 56.7 percent by weight solution of an adduct of toluylene diisocyanate and trimethylol propane in a solvent mixture based on an aliphatic acetic ester. After a reaction time of 1 hour at 25° C., the prepolymer solution, of a viscosity of 144 cp., is applied to the web support at a wet-layer thickness of 0.2 mm., as indicated in Example 1. The web speed of 0.5 m./min., the slot-shaped aperture of the die casting device is 0.4 mm., the distance from the slot-shaped aperture to the web surface is 0.2 mm., the length of the heating chamber is 15 m., and the temperature thereof is 130° C.

The lacquered multilayer material may be used for the same purposes as the multilayer material produced acccording to Example 1.

EXAMPLE 8

A product with similar properties to those of the product according to Examplee 1 is obtained in the following manner.

Preparation of the prepolymer solution: To 70 parts by weight of a 50 percent by weight solution of a linear polyester of 4,4'-dioxydibutylether and adipic acid (molecular weight 1,681, OH number 65) in a solvent mixture based on an aliphatic acetic ester, there are sequentially added, with stirring, at 20° C., 0.5 part by weight of a 10 percent by weight solution of dibutyl tin dilaurate in ethyl acetate and 30 parts by weight of a 56.7 percent by weight solution of an adduct of toluylene diisocyanate and trimethylol propane in a solvent mixture based on an aliphatic acetic ester.

After a reaction time of 10 minutes at 25° C., the prepolymer solution of a viscosity of 50 cp. is applied to the web support at a layer thickness of 0.2 mm., as indicated in Example 1. The web speed is 3 m./min., the slot-shaped aperture of the die casting device is 0.4 mm., the distance of the slot-shaped aperture from the web surface is 0.2 mm., the length of the heating chamber is 15 m., and the temperature thereof is 130° C.

The lacquered multilayer material may be used for the same purposes as the multilayer material produced according to Example 1.

It will be obvious to those skilled in the art that many modifications may be made within the scope of the present invention without departing from the spirit thereof, and the invention includes all such modifications.

What is claimed is:

1. A process for the priduction of a flexible, high-gloss layer of a polymer containing urethane groups on the surface of a layer of high-polymer material, based on polyurethane, on a fiber fleece support, which comprises
    continuously applying a liquid layer of a prepolymer solution at a uniform thickness to the surface of a microporous layer of a polymer based on polyurethane on a fiber fleece web moving at a constant speed, and
    heating said applied layer to polymerize the prepolymer, said prepolymer being the reaction product of at least one compound containing at least two NCO groups and at least one compound containing at least two terminal OH groups and having a molecular weight in the range of about 1000 to 3000.

2. A process according to claim 1 in which the prepolymer solution contains an accelerator.

3. A process according to claim 2 in which the accelerator is selected from the group consisting of organotin compounds and tertiary amines.

4. A process according to claim 3 in which the accelerator is dibutyl tin dilaurate.

5. A process according to claim 1 in which the heating time of the prepolymer layer is in the range of 20 to 40 minutes.

6. A process according to claim 1 in which the heating time of the prepolymer layer is in the range of 5 to 10 minutes.

7. A process according to claim 1 in which the prepolymer layer is heated to a temperature in the range of 80 to 130° C.

8. A process according to claim 1 in which the prepolymer layer is heated to a temperature of 100° C.

9. A process according to claim 1 in which the prepolymer layer has a wet-layer thickness in the range of 50 to 1000μ.

10. A process according to claim 1 in which the prepolymer layer has a wet-layer thickness in the range of 100 to 500μ.

11. A process according to claim 1 in which the prepolymer layer has a wet-layer thickness of 200μ.

12. A process according to claim 1 in which polymerized the prepolymer layer is cooled to a temperature in the range of 15 to 30° C.

13. A process according to claim 12 in which the prepolymer layer is cooled by contacting the uncoated surface of the web support with a cooled roll.

14. A process according to claim 12 in which the cooled prepolymer layer is covered with a smooth high-gloss film.

15. A process according to claim 14 in which the film is a polyester film.

16. A process according to claim 14 in which the film is a metallized polyester film, the metallized surface of which contacts the high-gloss layer.

17. A process according to claim 1 in which the prepolymer solution contains pigment.

18. A porous flexible, multilayer web comprising
a fiber fleece web support,
an intermediate microporous layer of a high polymer material based on polyurethane on said support, and
a high-gloss top layer of an in situ polymerized prepolymer, said prepolymer being the reaction product of at least one compound containing at least two NCO groups and at least one compound containing at least two terminal OH groups and having a molecular weight in the range of about 1000 to 3000.

References Cited
UNITED STATES PATENTS

| | | | |
|---|---|---|---|
| 3,481,767 | 12/1969 | Craven et al. | 117—161 KP |
| 3,501,326 | 3/1970 | Hochberg et al. | 117—76 T |
| 3,551,830 | 12/1970 | Hodge et al. | 117—161 KP |
| 3,522,081 | 7/1970 | Moyer | 117—119.2 |
| 3,539,388 | 11/1970 | TU | 117—161 KP |
| 3,046,174 | 7/1962 | Brooks et al. | 161—214 X |
| 3,387,989 | 6/1968 | West et al. | 117—161 KP X |
| 3,279,424 | 10/1966 | Brown et al. | 117—161 KP X |
| 3,475,200 | 10/1969 | Kallert et al. | 117—161 KP X |
| 3,567,499 | 3/1971 | Klebert et al. | 117—161 KP X |
| 2,753,276 | 7/1956 | Brochhagen et al. | 117—161 KP X |

RALPH HUSACK, Primary Examiner

U.S. Cl. X.R.

117—76 T, 119.2, 135.5, 161 KP; 156—190; 161—159, 190, 231